(12) United States Patent
Olivar

(10) Patent No.: US 10,154,224 B2
(45) Date of Patent: Dec. 11, 2018

(54) REMOTE CONTROLLER FOR ELECTRONIC APPLIANCES SUCH AS TELEVISION AND THE LIKE

(71) Applicant: Dante Ramel Olivar, Antipolo (PH)

(72) Inventor: Dante Ramel Olivar, Antipolo (PH)

(*) Notice: Subject to any disclaimer, the term of this patent is extended or adjusted under 35 U.S.C. 154(b) by 72 days.

(21) Appl. No.: 14/436,903

(22) PCT Filed: Jun. 14, 2013

(86) PCT No.: PCT/PH2013/000015
§ 371 (c)(1),
(2) Date: Apr. 20, 2015

(87) PCT Pub. No.: WO2014/182183
PCT Pub. Date: Nov. 13, 2014

(65) Prior Publication Data
US 2016/0050384 A1    Feb. 18, 2016

(30) Foreign Application Priority Data

May 6, 2013    (PH) .................. 2-2013-000203 U

(51) Int. Cl.
*H04N 5/44*    (2011.01)
*G06F 3/0338*    (2013.01)
(Continued)

(52) U.S. Cl.
CPC ......... *H04N 5/4403* (2013.01); *G06F 3/0338* (2013.01); *G06F 3/0362* (2013.01);
(Continued)

(58) Field of Classification Search
CPC .................................................. H04N 5/4403
(Continued)

(56) References Cited

U.S. PATENT DOCUMENTS 1,483,223 A    2/1924    Gaunt
D285,744 S    9/1986    Vinot
(Continued)

FOREIGN PATENT DOCUMENTS

CA    2263774 A1 *    9/2000
JP    D1290496    12/2006
(Continued)

OTHER PUBLICATIONS

Logitech releases M560 mouse for Windows 8, Announced Oct. 15, 2013; http://geeknewscentral.com/tag/logitech/. Retrieved Aug. 30, 2016.

(Continued)

*Primary Examiner* — Jefferey F Harold
*Assistant Examiner* — Omer Khalid
(74) *Attorney, Agent, or Firm* — Fish & Richardson P.C.

(57) ABSTRACT

This utility model relates to a remote controller for televisions, video recorders/players comprising a housing having an upper and lower shells, said upper shell being provided with a plurality of different slots adapted to receive different sizes of push buttons, and a printed circuit board with electronic parts disposed inside said housing, characterized in that a circular channel adjustment control and a volume adjustment control traversing respective slots on said upper shell, each of said circular channel and volume adjustment control being pivotally secured to said housing, and each being provided with opposing forward lug and rear lug protruding outwardly from the periphery thereof and in communication with said printed circuit board.

8 Claims, 1 Drawing Sheet

Figure 1:
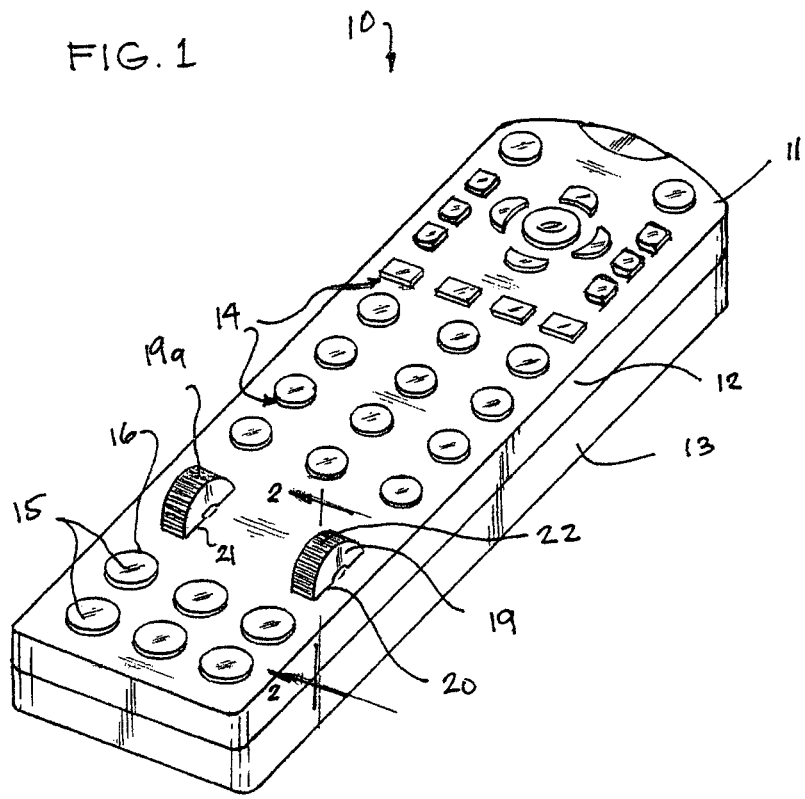

(51) Int. Cl.
*H04N 21/422* (2011.01)
*G06F 3/0362* (2013.01)
*H01H 19/14* (2006.01)
*H01H 19/46* (2006.01)

(52) U.S. Cl.
CPC ......... *H04N 21/4221* (2013.01); *H01H 19/46* (2013.01); *H01H 2019/146* (2013.01); *H04N 2005/4405* (2013.01)

(58) Field of Classification Search
USPC ........................................................ 348/734
See application file for complete search history.

(56) References Cited

U.S. PATENT DOCUMENTS

| | | | |
|---|---|---|---|
| 4,817,251 A | 4/1989 | Shirley-Smith et al. | |
| 6,016,139 A * | 1/2000 | Terasawa | G11B 27/102 345/157 |
| D443,513 S | 6/2001 | Goettner | |
| D463,281 S | 9/2002 | Druitt | |
| 6,525,277 B2 * | 2/2003 | Oba | H01H 13/807 200/4 |
| D479,529 S | 9/2003 | Sheehan et al. | |
| D498,590 S | 11/2004 | Borovsky | |
| D500,677 S | 1/2005 | Druitt | |
| D510,523 S | 10/2005 | Pittman et al. | |
| D512,565 S | 12/2005 | Sasso | |
| D519,508 S | 4/2006 | Canavan et al. | |
| D523,013 S | 6/2006 | Twohig et al. | |
| D524,656 S | 7/2006 | Baron | |
| 7,091,431 B1 * | 8/2006 | Arcand | H01H 1/42 200/48 R |
| D528,118 S | 9/2006 | Canavan et al. | |
| D531,118 S | 9/2006 | Poulet | |
| 7,234,986 B2 | 6/2007 | Kowalski et al. | |
| D551,448 S | 9/2007 | Stull | |
| D606,401 S | 12/2009 | Kamath et al. | |
| D613,162 S | 4/2010 | Druitt | |
| D634,248 S | 3/2011 | Chen | |
| D638,707 S | 5/2011 | Stoffers et al. | |
| 8,253,866 B1 * | 8/2012 | Weber | H04N 21/42206 348/734 |
| D673,852 S | 1/2013 | Wood et al. | |
| D693,683 S | 11/2013 | Ramsey et al. | |
| D713,778 S | 9/2014 | Muthigi et al. | |
| D713,779 S | 9/2014 | Inoue | |
| D713,782 S | 9/2014 | Krier et al. | |
| D714,051 S | 9/2014 | Priebe et al. | |
| D714,146 S | 9/2014 | King | |
| D714,147 S | 9/2014 | Lindstrom, Sr. | |
| D714,212 S | 9/2014 | Wang | |
| D715,439 S | 10/2014 | Huang | |
| D715,511 S | 10/2014 | Okwumabua | |
| D736,184 S | 8/2015 | Olivar | |
| 2005/0162397 A1 * | 7/2005 | Kwon | G06F 3/0231 345/169 |
| 2013/0207448 A1 | 8/2013 | Koshiyama et al. | |
| 2013/0292918 A1 | 11/2013 | Schlee et al. | |
| 2014/0135160 A1 | 5/2014 | Kaiser et al. | |
| 2014/0152075 A1 | 6/2014 | Kanatani | |

FOREIGN PATENT DOCUMENTS

| | | |
|---|---|---|
| JP | D1457577 | 12/2012 |
| KR | 300665842.0001 | 4/2013 |
| WO | WO 03/030092 A1 * | 4/2003 |
| WO | WO 03/090008 A2 * | 10/2003 |

OTHER PUBLICATIONS

LG47LA7400 Review 47 Inch 1090P Cinema 3D 24HZ LED TV, announced Apr. 8, 2013; http://reviews.ledtvbuyingguide.com/lg-lcd-tv/lg-471a7400.html. Retrieved Aug. 26, 2016.

Somfy 1810975 Telis 1 Modulis RTS Wirless Remote with Scroll Wheel-Silver, Announced Apr. 18, 2010, http://www.smarthome.com/somfy-1810975-telis-1-modulis-its-wireless-remote-with-scroll-wheel-silver.html. Retrieved Aug. 26, 2016.

* cited by examiner

REMOTE CONTROLLER FOR ELECTRONIC APPLIANCES SUCH AS TELEVISION AND THE LIKE

FIELD OF THE UTILITY MODEL

This utility model relates generally to remote control devices for operation of an electronic appliance such as television, video recorders/players and the like, but more particularly to a remote controller having rotary selector switch to change channels or to increase and decrease the volume of the television or video recorder/player.

BACKGROUND OF THE UTILITY MODEL

Remote control units for televisions are used to control all operations of a television and video recorders/players or the like. The units are made so that they are universal and can be programmed for the majority of televisions available on the market today. The operation is by sending an infrared signal from the control unit to an infrared receiver on the television, video recorders/players or the like. Remote control are used to change channels, volume control, on/off control and many features that different televisions are equipped with today. These remote control units are usually equipped with push button selector switch for changing the channels or to adjust the volume of the television, video recorders/players or the like. In many occasions especially when in dark places, the user or viewer of the television would have difficulty changing the channels or decrease/increase the volume thereof, Due to the uniform sizes of the channel control switches, volume control switch and other switches which are in the form of buttons, the user tends to push a wrong button, thus if the user wants to change channels, he would tend to push the volume control switch or other switches instead of the channel selector button.

The primary object of this utility model therefore is to provide a remote controller for televisions, video recorders/players having a circular channel and volume selector switch which is different from the other control switches of the remote control.

Another object of this utility model is to provide a remote controller for televisions, video recorders/players wherein the user can easily determine the correct switch button when changing channels or adjust the volume of the televisions, video recorders/players.

Yet, an object of this utility model is to provide a remote controller for televisions, video recorders/players that is very easy to manufacture using simple and ordinary equipment.

These and other objects and advantages will come to view and be understood upon a reading of the detailed description when taken in conjunction with the accompanying drawing hereof.

Figure 2:
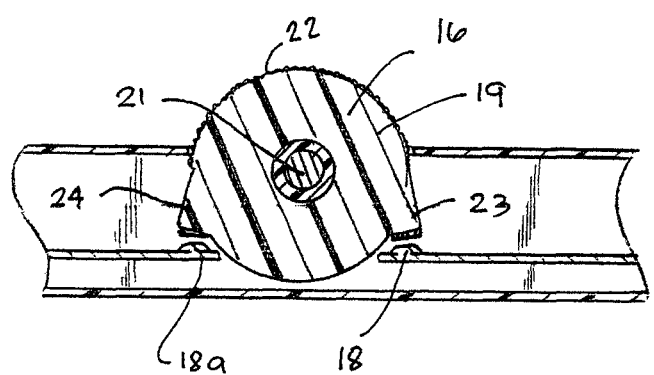

FIG. 1 is a perspective view of the remote controller for televisions, video recorders/players according to the present utility model; and FIG. 2 is a partial sectional view when taken along line 2-2 of FIG. 1.

Referring now to the several views of the drawing, wherein like reference numeral designates same part throughout. Shown is a utility model for a remote controller for televisions, video recorders/players and the like generally designated as reference numeral 10.

Said remote controller 10 comprises an elongated generally flat housing 11 being defined by a pair of upper and lower shell 12 and 13. Said upper shell 12 is provided with a plurality of different kind of slots 14 adapted to receive different sizes of push buttons 15 intended for changing channels and for setting up different kinds of program activities, such as on/off button, mute button or for accessing the menu options.

Inside a typical remote control, a printed circuit board (not shown) is provided. Said circuit board is a thin piece of fiber glass having a thin copper wires etched onto its surface. Electronic parts such as chips, transistors, etc. are also assembled on said printed circuit boards and are connected to said copper wires.

The different push buttons 15 are made of thin rubbery material 16 and are each provided with black conductive disk 17 at the bottom thereof. Said black conductive disk 17 are spacedly disposed from the contact member 18 located on said printed circuit board, such that when the push button 15 is pressed downwardly, the black conductive disk 17 touches said contact member 18, thus is connected to the chip which senses the engagement of the particular button thereof. This step would produce a morse-code-line signal specific to that button. The transistors then amplify the signal and send them to a light emitting diode LED (not shown) which is usually located at one end of the housing 11, and translates said signal into infrared light that is received by the television/video recorder or player's sensor.

As best seen in the drawing, the novel feature of this utility model is in the provision of a pair of individual circular channel and volume adjustment controls 19 and 19a made of rubbery material, and each traversing a pair of spaced apart rectangular slots 20 and 20a on said housing 11, and respectively connected pivotally along at their centers with extending shafts 21 secured to said housing 11. Each of said channel and volume adjustment controls 19 and 19a are defined by a circular rubber member having a plurality of transverse ridges 22 along the periphery thereof and a pair of opposing forward lug 23 and rear lug 24 protruding outwardly from the periphery thereof. Said forward lug 23 and rear lug 24 are each provided with black conductive disks 15 that communicate with their respective contact members 18 and 18a of said printed circuit board. By means of pushing the circular channel and volume adjustment control 19 and 19a, the forward lug 23 would push the front contact member 18 to change an existing channel to higher channels or increase volume of the television or video recorder/player and the like. The retraction of said channel and volume adjustment control 19 and 19a, the rear lug 24 would push the rear contact member 18a to adjust the program of the television to lower channels or decrease the volume thereof.

While this invention has been particularly shown and described above, it will be understood by those skilled in the art that various changes in form and details may be made therein without departing from the scope and spirit of the invention encompassed by the appended claims. For example, said circular rubber member may also be adapted to be used in all buttons of the remote control.

The invention claimed is:

1. A remote controller for televisions and/or video recorders/players, comprising a housing having an upper shell and a lower shell, said upper shell being provided with a plurality of different slots adapted to receive different sizes of push buttons, a printed circuit board with electronic parts disposed inside said housing, and a circular channel adjustment control and a volume adjustment control traversing respective slots on said upper shell, each of said circular channel and volume adjustment control being mounted pivotally to a respective cylindrical shaft on said upper shell of said housing apart from the printed circuit board, and each being provided with an opposing forward lug and rear lug protruding outwardly from a periphery thereof, the lugs oriented to selectively contact members of said printed circuit board when the respective circular channel and volume adjustment control is pivoted to signal changing the channel or volume and limiting the extent of the pivoting of the respective adjustment control.

2. The remote controller of claim 1 wherein each of said circular channel adjustment control and volume adjustment control are provided with a plurality of transverse ridges disposed at the periphery thereof.

3. The remote controller of claim 1 wherein said circular channel adjustment control and volume adjustment control are made of rubbery material.

4. The remote controller of claim 1, where the shaft is elongate and extends axially in a top plane of the upper shell of the housing.

5. The remote controller of claim 4, where the surface of the housing having the plurality of different slots is elongate and where each shaft is oriented with its longitudinal axis transverse to the longest dimension of the surface.

6. The remote controller of claim 4, where the circular channel adjustment control and volume adjustment control each protrude proud above all other buttons of the remote controller.

7. The remote controller of claim 1, where the circular channel adjustment and volume adjustment control have a circular profile and the lugs protrude from the circular profile.

8. The remote controller of claim 1, where the lugs each comprise black conductive disks that selectively contact respective ones of the contact members of the printed circuit board.

* * * * *